United States Patent Office 3,540,145
Patented Nov. 17, 1970

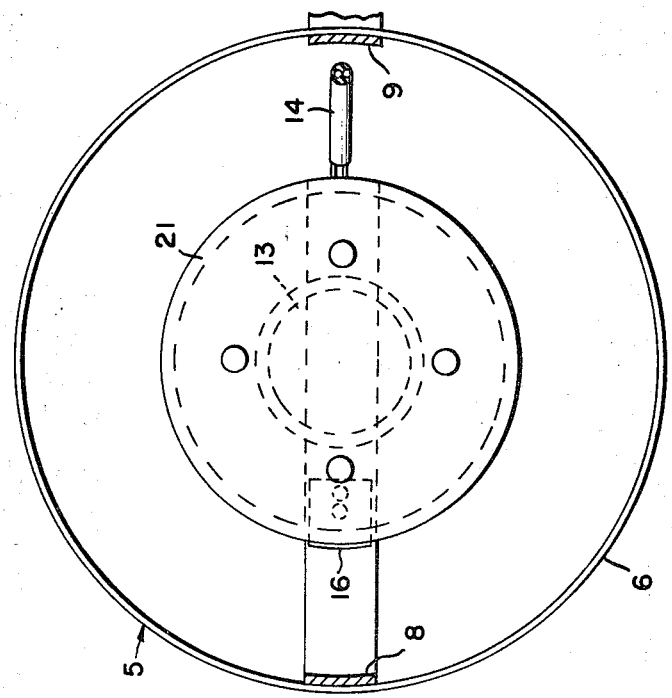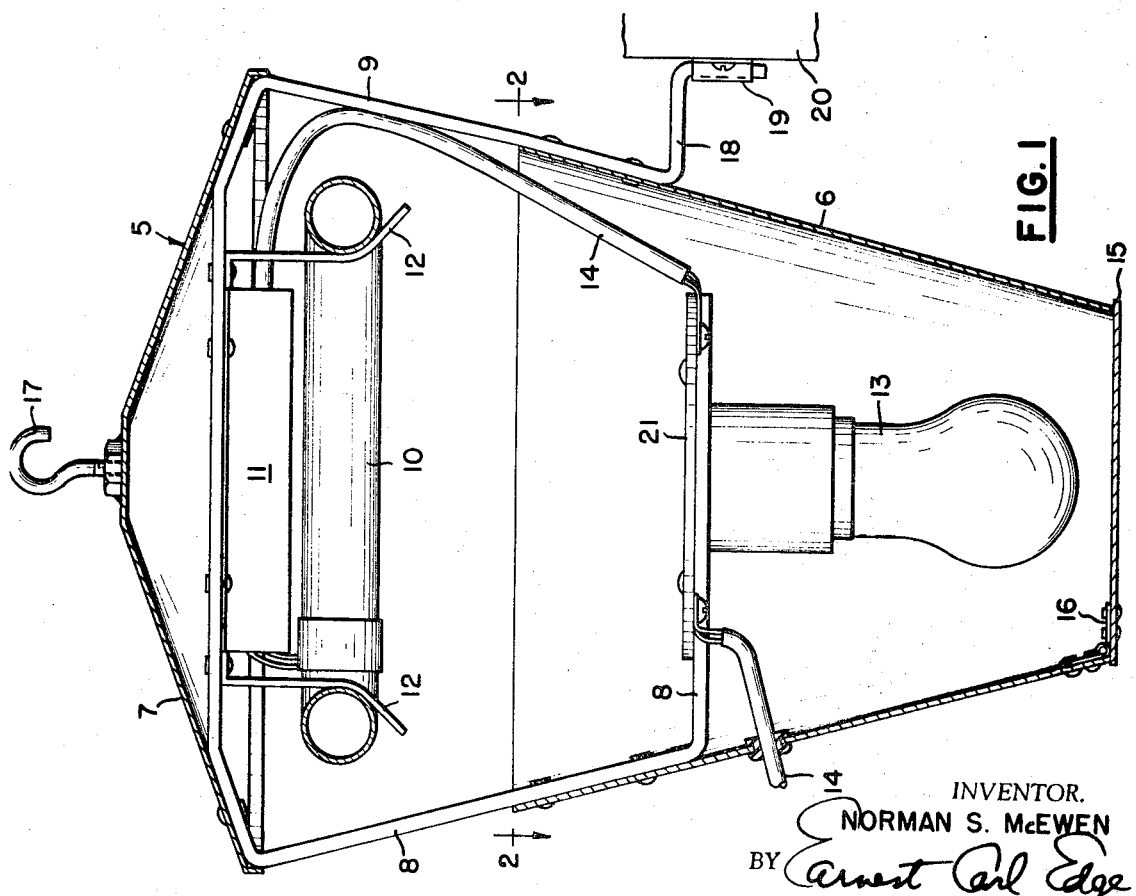

3,540,145
INSECT EXTERMINATOR
Norman S. McEwen, 437 NE. 8th Ave.,
Fort Lauderdale, Fla. 33301
Filed July 31, 1967, Ser. No. 657,317
Int. Cl. A01m 1/04
U.S. Cl. 43—113  5 Claims

ABSTRACT OF THE DISCLOSURE

An insect exterminator having a light source for attracting insects and a heat source for dehydration of the attracted insects.

BACKGROUND OF THE INVENTION

It is well known in the art to attract insects by the use of black light. Black light is the popular name for near ultraviolet energy and although technically it is not light, since the human eye is insensitive to it, it is commonly known and referred to as black light. The most common man-made sources of black light are black light fluorescent lamps and mercury vapor lamps, both readily available in the marketplace today.

The first use of black light to attract insects was simply a source of black light. Once the insects were attracted they were sucked or forced by an artificial draft into a collection container and then destroyed.

The light was then combined with a fan into a single unit and a collection bag was mounted on the device so as to present a completely self-contained unit. Once the bugs were inside the collection bag, they were left to die a natural death or to be suffocated with the result being that when the bag was collected or emptied, it contained an odorous collection of bugs, some of which were dead and some of which were still struggling to keep alive.

Another step forward was the combining of the source of black light with an energized grid. It is well known in the art to utilize high voltage electricity to bring about the destruction of insects, and it is usual to employ two spaced apart metal grids which are placed in series in a high voltage electrical circuit, so that, upon an insect or the like passing through these grids the gap is temporarily bridged, the insect being electrocuted, and due to the nature of the electrical current, usually burned to an ash.

The greatest drawback to the energized grid is that it is by necessity large and cumbersome. It has to be large to be effective, for once the insects are attracted to the source of light, they pass through the grid by chance. A small grid offers unfavorable odds for electrocuting many bugs.

Another drawback to the grid or grill is that due to its necessarily large size, the electrodes are also very long and have to be placed some distance apart in order that a sudden jar or jolt will not force the electrodes to touch and complete the circuit. As the electrodes are spaced far apart, the device is not effective on insects smaller than the common housefly. Small insects such as sand flies, stinging gnats, etc., completely escape and are not affected by it at all.

Such devices are not only clumsy, but also potentially dangerous. Furthermore, they are often not suited to mass production and, therefore, are not readily available to the general public, and are often not acceptable to the public because of the general appearance. Women particularly object to the cracking and sizzling of bugs directly before their eyes.

SUMMARY OF THE INVENTION

It is the primary object of my invention to provide an insect exterminator which will attract the bugs, collect them, and then kill them by dehydration without leaving an unsightly mess and doing so without the use of dangerous electric grids.

It is a further object of my invention to provide an insect exterminator which uses an ordinary incandescent lamp or the like placed in the collection container as a means of killing the bugs.

It is a still further object of my invention to provide a bug light which will collect and kill the insects by removing the moisture from their bodies, but leaves the bodies of the insects in tact so that they may be used for entomological purposes, for feeding of birds, for fertilizer, etc.

It is a further object of my invention to provide an exterminator which may easily be emptied of the dead carcasses, either manually or automatically.

It is also an object of the present invention to provide an exterminator for insects which is both compact and neat and which presents a general pleasing appearance, making it suitable for use in almost any setting.

A still further object of the invention is to provide an exterminator which is sanitary and inoffensive to human sight and smell.

Further objects, advantages and uses of the invention will be more apparent from the following description taken in conjunction with the accompanying drawing.

BRIEF DESCRIPTION OF THE DRAWING

FIG. 1 is a cross-sectional view of an insect exterminator according to my invention;

FIG. 2 is a cross-sectional view taken substantially on the lines 2—2 of FIG. 1;

DESCRIPTION OF THE PREFERRED EMBODIMENT

Referring now to the drawing, FIG. 1 shows insect exterminator 5 which is comprised of a top member 7 and a body member 6. Top member 7 is above and held spaced from body 6 by means of top supports 8 and 9. These supports 8 and 9 are shown here as relatively thin strap members in order that the open space between the top 7 and the body 6 may be as completely free of obstruction as possible.

Support 8 extends up into the top member 7 and provides a support for black light source 10 which is shown here as an ordinary "circle line" black light 2. It is held in position below ballast members 11 by means of downwardly extending fingers 12. As will be noted in FIG. 1, the black light source 10 is placed below top member 7 in order that it will be located in the open space between the top member 7 and the body member 6. Although only one bulb 10 is illustrated here a plurality of bulbs 10 may be utilized and still fall within the scope of this disclosure.

Support member 8 also extends down into body member 6 and serves as a support for heat source 13. The heat source is shown here as an ordinary incandescent bulb which is supplied with electricity by wire 14 connected to an ordinary electrical outlet. Electrical line 14 also extends upwardly and is connected to ballast 11 to supply electrical energy thereto for the lighting of black light source 10.

The bottom of body member 6 is closed by means of door 15 shown here as attached thereto by means of a spring hinge 16. If desired, door 15 may be automatically operated by means of a solenoid not shown which will keep the door closed during the time the insect exterminator is in operation and which automatically opens the door to empty the collected insects when the insect exterminator is turned off.

Insect exterminator 5 is provided with a hook member 17 at the top thereof whereby the lamp may be hanged from a support. It is also shown with a support member 18 extending from the side of body 6 which is adapted to be placed within a holder 19 on a support 20.

Within body member 6, supported by support 8 is a baffle member 21 shown here as circular in cross section. FIG. 2 illustrates the size of the baffle in relation to the cross sectional area of body member 6. Baffle plate 21 should be large enough to prevent the escape upwardly of insects once they are in the lower section of body member 6, but it should also be small enough to permit light rays from heat source 13 to escape upwardly around it.

Operation of my insect exterminator is as follows: when the exterminator is turned on, light source 10 is illuminated and heat source 13 is also energized. Hinged spring 16 is holding door 15 in a closed position. Due to the open space between top member 7 and body member 6 light source 10 can be seen by an insect located in any direction from the exterminator as the light shines in a 360 degree area. As an insect is attraced to light source 10 it will approach the light and move into the open area below cover 7. Once the insect is in this location it will be further attracted by heat and light source 13 and will make a positive effort to travel to heat source 13, or fall by gravity into the body of member 6, where it will be exterminated. The heat from heat source 13 is high enough to kill the bug, but still not high enough to burn the body thereof. The body will become dehydrated by the relatively low heat of source 13 leaving only a dried carcass.

Although the insects are attracted primarily to fluorescent light source 10, some of the rays of incandescent lamp 13 will extend upwardly and be seen by the insects before they approach the exterminator. Since insects in general have very poor eyesight and since many of the hundreds of different varieties may be able to see and be attracted by one color, or kind or combination of light, they may be totally blind to another light that appears to the human eye to be of equal brilliance, intensity or value. The incandescent or yellow light showing through and around the black light and through the open space between the top member and the body member has a tendency to alter the light values to cover the color spectrum from deep blue, through the various shades of green to yellow, thus enabling far more insects to be attracted and destroyed than could be accomplished through the use of a single light or a light or lights facing in one direction only.

As the insects are killed by the heat from heat source 13 they fall to the top of door 15 and are accumulated thereon. To empty the chamber door 15 is moved downwardly and the dead insects may be removed.

As the bugs are merely dehydrated and not scorched or burned, they may be used for entomological studies, as feed for fish or fowl who trive on such a diet, as specimens for insect collectors, etc. Also due to the fact that substantially all moisture is removed from the body of the bug there is no deterioration of the body, thereby causing an obnoxious odor to emanate from the light even if the insects are not emptied every day.

Although the embodiment shown in the drawing has tapering sides, with the body portion being frusto-conical in shape, in some instances it may be desired to have straight sides with the body portion being substantially cylindrical. A cylindrical body will increase the size of the collection chamber so that a larger collection of bugs may be made before it has to be emptied. This becomes important in areas where it is difficult to empty the chamber every few hours.

If desired, the walls of the body portion may be made of a transparent or a translucent material so as to permit more of the light rays from heat and light source 10 to escape and thereby attract a greater number of insects.

It will be obvious to those skilled in the art that my exterminating chamber which utilizes a relatively low heat bulb to dehydrate the insects may be adapted to insect lights presently in existence. This chamber, for instance, could be substituted for the disposable plastic collection bags now in widespread use on insect lights.

The foregoing disclosure and description of the invention is illustrative and explanatory thereof and various changes in the size, shape and material, as well as in the details of the illustrated construction may be made, within the scope of the appended claims, without departing from the spirit of the invention.

What is claimed is:

1. An insect exterminator including in combination,
   (a) a frame means having an upper portion,
   (b) an insect collecting chamber affixed to said frame means and having passageways for the passage of light to said upper frame portion,
   (c) an ultraviolet light source supported by said upper frame means in a position to attract insects by ultraviolet light into or to the vicinity of said collecting chamber,
   (d) an incandescent lamp bulb supported in said collecting chamber, said incandescent lamp bulb constituting a means for dispersing substantially white light from said upper frame means which further attracts insects to said chamber and for supplying heat of a temperature in said chamber for exterminating the insects and causing them to be deposited in said chamber without burning the insects up, and
   (e) means for illuminating said ultraviolet light source and said incandescent lamp bulb.

2. The insect exterminator as claimed in claim 1 in which said collecting chamber has means for removing the collected insects.

3. The insect exterminator as claimed in claim 2 in which said means for removing the collected insects comprises a door.

4. The insect exterminator as claimed in claim 2 in which said collecting chamber has an opening at the top thereof whereby insects may enter said chamber and rays of light may exit.

5. The insect exterminator as claimed in claim 4 in which said collecting chamber has an insect restraining baffle means at the top thereof smaller than the cross-sectional area of said collecting chamber whereby light rays may escape from said chamber and insects are trapped.

References Cited

UNITED STATES PATENTS

| | | | |
|---|---|---|---|
| 3,123,933 | 3/1964 | Roche | 43—139 |
| 988,476 | 4/1911 | LaBaum | 43—113 |
| 1,368,767 | 2/1921 | Smedberg | 43—113 |
| 1,713,557 | 5/1929 | Sauer | 43—113 |
| 2,513,544 | 7/1950 | Yarbrough | 43—113 |
| 3,059,373 | 10/1962 | Gardner | 43—113 |
| 3,319,374 | 5/1967 | Gawne | 43—113 |

ALDRICH F. MEDBERRY, Primary Examiner